United States Patent
Lilly

(10) Patent No.: US 7,222,714 B2
(45) Date of Patent: May 29, 2007

(54) IN-LINE SLIDE GATE FOR CONVEYOR SYSTEM

(75) Inventor: Jeremy R. Lilly, Taylorville, IL (US)

(73) Assignee: The GSI Group, Inc., Assumption, IL (US)

( * ) Notice: Subject to any disclaimer, the term of this patent is extended or adjusted under 35 U.S.C. 154(b) by 60 days.

(21) Appl. No.: 11/220,274

(22) Filed: Sep. 6, 2005

(65) Prior Publication Data

US 2007/0051587 A1   Mar. 8, 2007

(51) Int. Cl.
*B65G 47/34*   (2006.01)
(52) U.S. Cl. .................. 198/359; 198/370.1; 198/860.4
(58) Field of Classification Search .............. 198/359, 198/360, 860.4, 735.4, 370.01
See application file for complete search history.

(56) References Cited

U.S. PATENT DOCUMENTS

| | | | |
|---|---|---|---|
| 489,289 A | 1/1893 | Dodge | |
| 3,511,363 A * | 5/1970 | Sibitz | ........................ 198/359 |
| 3,774,751 A | 11/1973 | Bakker | |
| 3,918,572 A | 11/1975 | Wirth et al. | |
| 4,023,673 A | 5/1977 | Hansen | |
| 4,058,199 A | 11/1977 | Schlagel | |
| 4,201,287 A | 5/1980 | Straub et al. | |
| 4,705,160 A * | 11/1987 | Grundken et al. | ....... 198/735.4 |
| 5,390,429 A | 2/1995 | Long | |
| 6,059,094 A | 5/2000 | Swans | |
| 6,119,849 A | 9/2000 | Svejkovsky et al. | |
| 6,505,727 B2 | 1/2003 | Schroeder et al. | |
| 6,945,382 B2 * | 9/2005 | Harstad et al. | ............. 198/360 |
| 2002/0088694 A1 * | 7/2002 | Thompson et al. | ...... 198/752.1 |

* cited by examiner

*Primary Examiner*—Mark A. Deuble
(74) *Attorney, Agent, or Firm*—Polster, Lieder, Woodruff & Lucchesi, L.C.

(57) ABSTRACT

An in-line gate is provided for a conveyor for particulate lading. The gate comprises a gate plate which is movable between a raised position in which the gate plate engages a seal extending at least along the sides of the conveyor exit and a lowered position in which the plate is beneath the conveyor's trough floor. In the lowered position, the gate plate is moved parallel to the direction of the conveyor between a closed position in which the plate blocks the opening and an open position in which the gate plate is positioned beneath the conveyor trough.

14 Claims, 3 Drawing Sheets

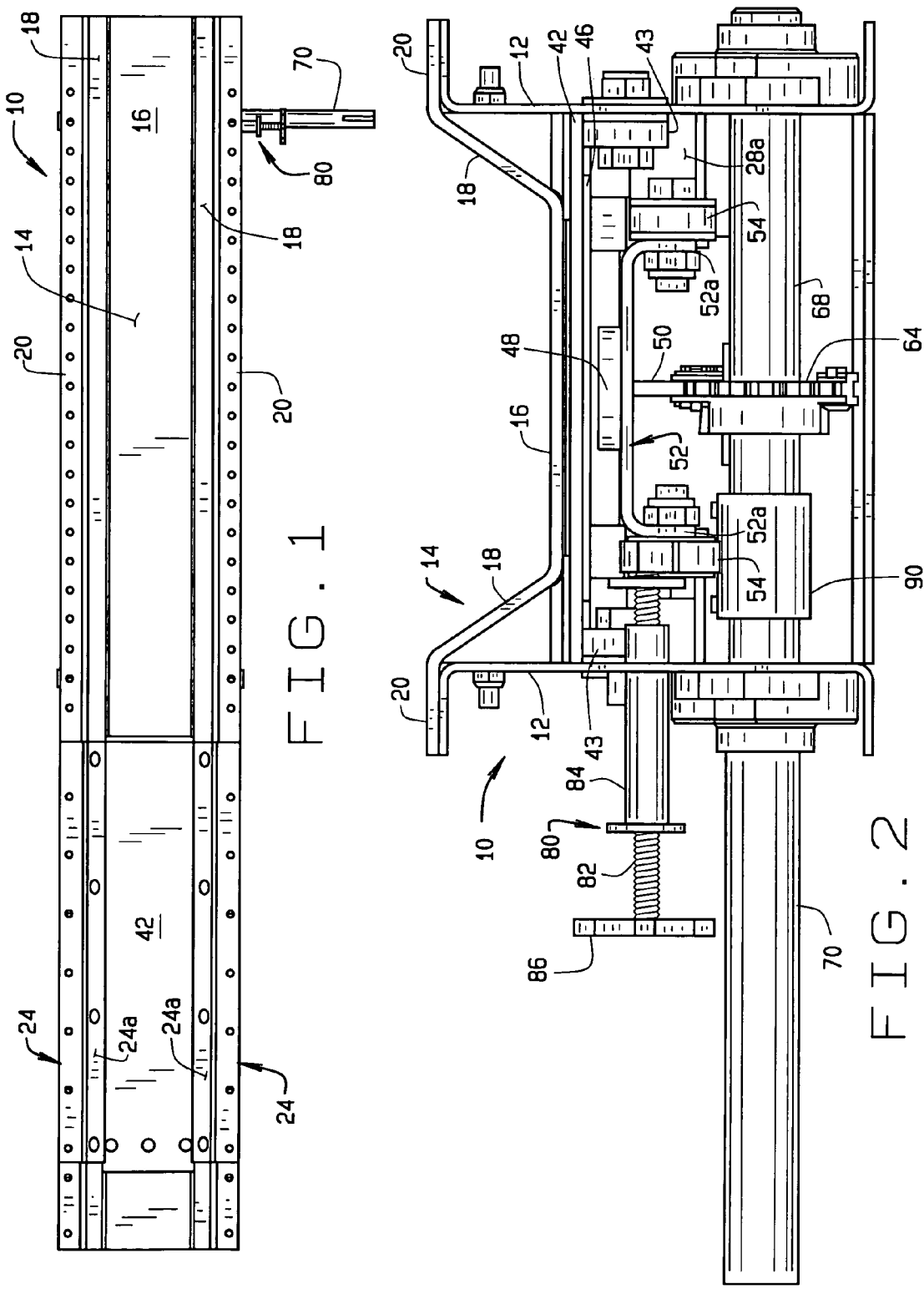

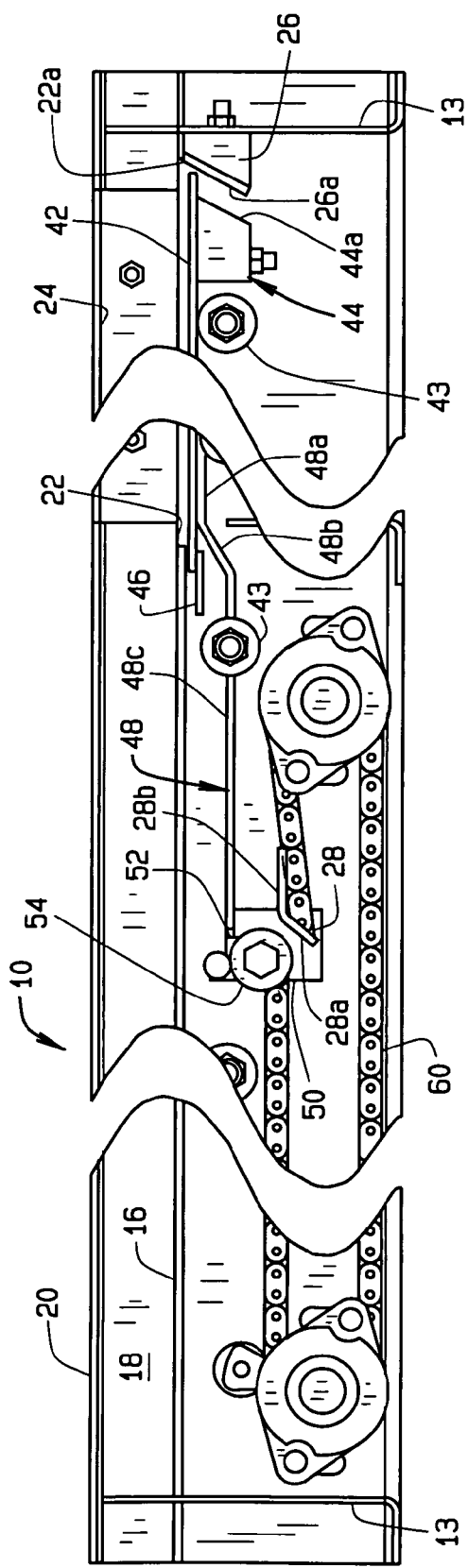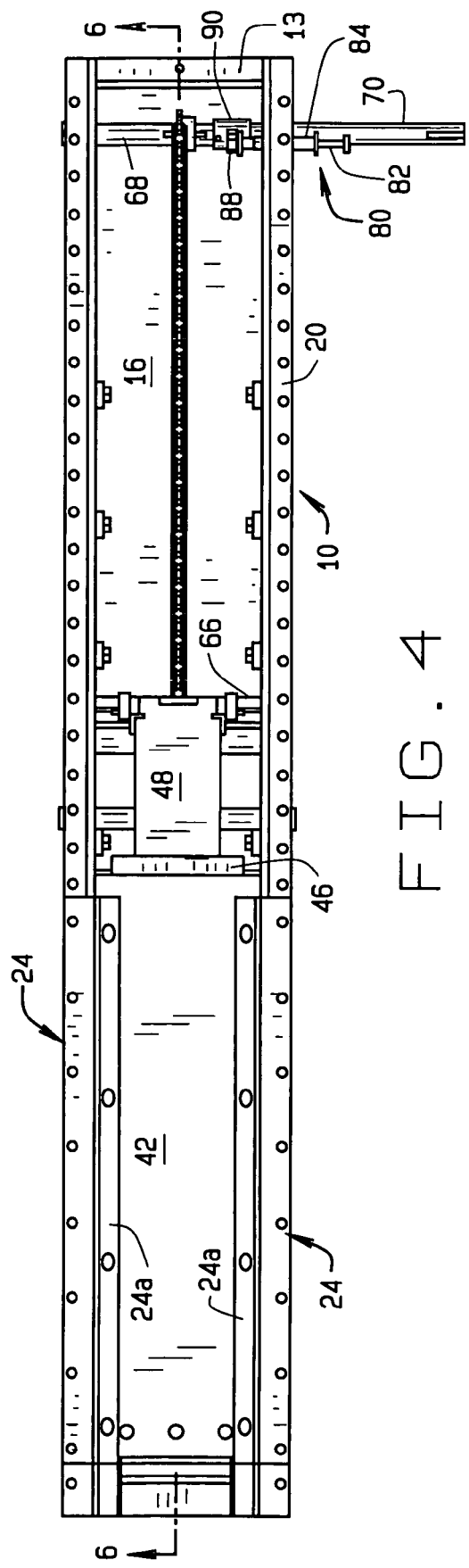

IN-LINE SLIDE GATE FOR CONVEYOR SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This application relates to slide gates for conveyor systems, and in particular, to a conveyor slide gate in which the gate opens axially relative to the conveyor.

The use of conveyors to transport material is well known. Often, conveyors for flowable bulk material (such as grain, for example) will include a slide gate to allow the bulk material to exit the conveyor through an opening in the bottom of the conveyor trough. To allow for a gate to be moveable between an open and a closed position, the gate member must slide relative to the trough. Typically, the gate member is positioned beneath the conveyor trough and moves relative to the bottom of the conveyor trough. In such systems, the flowable material transported by the conveyor can become lodged between the gate and the trough, thereby interfering with the operation of the gate.

BRIEF SUMMARY OF THE INVENTION

Briefly stated an in-line gate assembly is provided for a conveyor to allow discharge of granular or particulate lading (such as grain) through an opening in the floor of the conveyor. A conveyor comprises a pair of spaced apart side rails, a trough positioned between the side rails, an exit port in the conveyor floor through which the granular material can pass, a seal extending along side edges of the port, and a gate assembly movable between an open position in which the exit port is open and the lading can pas therethrough and a closed position in which the port is closed and the particulate lading cannot pass. The seal can be in the form of a flange extending into the opening at the level of the trough floor, such that the bottom surface of the flange is approximately flush with the top surface of the trough. The flange extends substantially the length of the exit port.

The gate assembly comprises a plate movable parallel to the direction of the conveyor; a drive for moving the plate along to switch the gate assembly between its open and closed positions; and means for vertically moving the plate between a raised position in which the plate is engages the seal and is generally flush with the trough floor and a lowered position in which the plate is below a level of the trough floor such that the plate can be moved beneath the trough floor by the drive.

Illustratively, the means for vertically moving the plate comprises a pair of forward elevating members and a pair of rear elevating members. Each pair of elevating members each comprising a movable part operatively mounted to the plate and a fixed part operatively mounted to the conveyor rails. The moveable and fixed parts of the two pair of elevating members cooperate with each other to raise and lower the plate as the plate is moved axially relative to the rails. In one embodiment, the forward pair of elevating members can comprise a pair of wedges. The fixed wedge is mounted between the rails proximate the forward edge of the exit opening and the movable wedge is fixed to the underside of the plate proximate the forward edge of the plate. The rear elevating members comprise a ramp and a roller. The ramp can be mounted to the rails and the roller can be operatively mounted to the plate, however, the positions can be reversed. Additionally, the plate can be provided with an extender which extends rearwardly of the plate, and the rear movable elevating member will then be mounted to the extender.

The means for vertically moving the plate operate, as the gate assembly is moved between its open and closed positions. When the gate assembly is moved from its closed position to its open position, the plate is lowered from its raised and sealed position to a lowered position in which the gate plate can slide beneath the trough floor. Conversely, when the gate assembly is moved from its open position to its closed position, the plate is raised from its lowered position to its raised and sealed position such that the plate engages the flange/seal and is generally flush with the trough floor. This will enable the gate plate to present what is effectively a continuation of the trough floor. That is, the trough floor and gate plate will form a substantially smooth surface.

The ability for the gate plate to move parallel to, and beneath the trough floor, as opposed to laterally relative to the trough floor, enables conveyors provided with the gate assembly of the present invention to be installed in narrower spaces.

BRIEF DESCRIPTION OF THE SEVERAL VIEWS OF THE DRAWINGS

FIG. 1 is a top plan view of a conveyor incorporating a gate of the present invention;

FIG. 2 is transverse cross-sectional view of the conveyor;

FIG. 3 is an enlarged, fragmentary, lateral cross-sectional view of the gate assembly of the present invention;

FIG. 4 is a top plan view of the conveyor assembly with the conveyor trough removed to show additional elements of the gate assembly;

Corresponding reference numerals will be used throughout the several figures of the drawings.

DETAILED DESCRIPTION OF THE INVENTION

Figure 5:
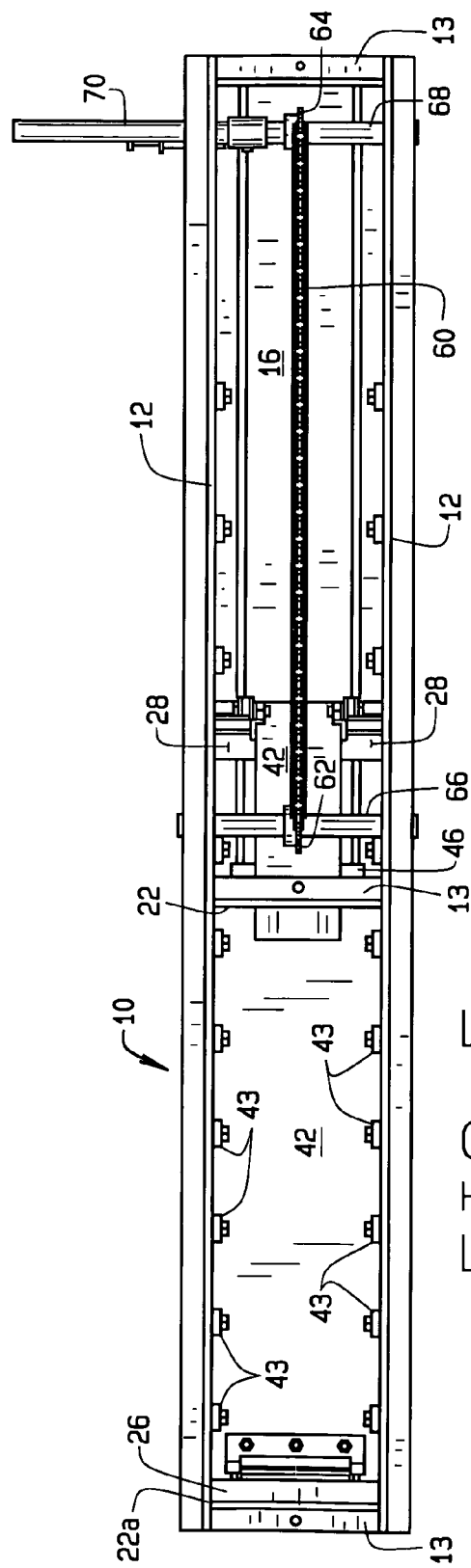
FIG. 5 is a bottom plan view of the conveyor with the gate assembly of the present invention.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Turning initially to FIGS. 1 and 2, a conveyor 10 includes a pair of elongate spaced-apart side rails 12. Spacers 13 extend between the rails 12 to maintain the desired spacing between the rails 12. Three spacers 13 are shown in the figures—one at the back of the conveyor section, one at the front of the conveyor section, and one in the approximate middle of the conveyor section. More or fewer spacers could be used as desired. A trough 14 extends between the rails 12 and is comprised of a floor 16 and sloped sides 18. Flanges 20 extend from the tops of the sides 18 over the top of the rails 12 to facilitate mounting of the trough 14 to the rails 12. As is known, a system for moving the lading will be associated with the trough. Such a system can comprise a vibrator which vibrates the trough to move the lading along the trough, a belt which receives the lading, movable or rotatable flights which cause the lading to move along the trough, or any other desired type of lading moving system. The lading moving system of the conveyor does not form a part of the invention, and is thus not shown or described herein.

An opening, port, or exit 22 is formed in the conveyor at a forward end of the trough 14. As can be appreciated, the opening 22 could be formed intermediate the ends of the trough if desired. Side bumpers 24 are mounted to the rails 12 on opposite sides of the opening 22 and extend the length of the opening. As best seen in FIGS. 1 and 4, the side bumpers 24 include a flange 24a which extends from the bottom of the bumper into the opening 22. An end wedge 26 having a sloped surface 26a is mounted between the rails 12 at the forward edge of the opening 22. As shown, the wedge 26 is fixed to the forward spacer 13. The sloped surface 26a extends downwardly and rearwardly from the forward edge 22a of the opening 22. The surface 26 extends substantially the full width of the opening 22, as seen, for example, in FIG. 5. A ramp 28 is mounted to the inner surface of the rails 12 rearwardly of the opening 22. The ramp 28 includes a sloped rear surface 28a and a generally level surface 28b extending forwardly of the sloped surface 28a.

A gate assembly 40 is movable relative to the opening 22 between a first position in which the opening is opened and a second position in which the opening is closed. The gate assembly 40 includes a plate 42 having a length substantially equal to the length of the opening 22. The plate has a width greater than the distance between the inner edges of the side bumper flanges 24a. A plurality of rollers 43 is mounted to the rail 12 to facilitate movement of the plate 42 in a direction generally parallel to the direction of the conveyor trough 14. The rollers 43 are positioned such that when the plate 42 is resting on the rollers 43, the top surface of the plate will be spaced slightly below the side bumper flanges 24a and below the trough floor 16, such that the plate 42 can slide beneath the trough floor 16 to open the exit port 22.

A plate end wedge 44 having a forwardly and upwardly sloping surface 44a is positioned such that the top of the surface 44a is spaced slightly rearwardly of the forward edge of the plate 42. The wedge 44 has a width less than the width of the plate 42 to allow for the wedge 44 to pass between the rollers 43 as the plate 42 is moved. The wedge 44 is shown centered with respect to the plate 42. The sloped surface 44a of the wedge 44 corresponds generally to the slope of the surface 26. As will be described below, when the gate assembly is closed, the wedge surface 44a slides over the surface 26 to raise plate 42 such that it is generally flush and parallel with the trough floor 16. The wedge surfaces 26a and 44a are preferably made from a material having a low coefficient of friction, such that the two surfaces can slide relative to each other without undue resistance. The wedge 44 is shown mounted to the underside of the plate 42 using fasteners (such as screws or bolts). However, the wedge can be mounted to the underside of the plate 42 in any desired fashion.

An extender bar 46 is mounted to the back of the plate 42. The extender bar 46 is generally centered across the width of the plate 42 and has a length slightly less than the width of the plate 42. The extender bar 46 will close any gap between the back of the plate 42 and the trough floor 16 when the gate assembly is closed.

Figure 7:
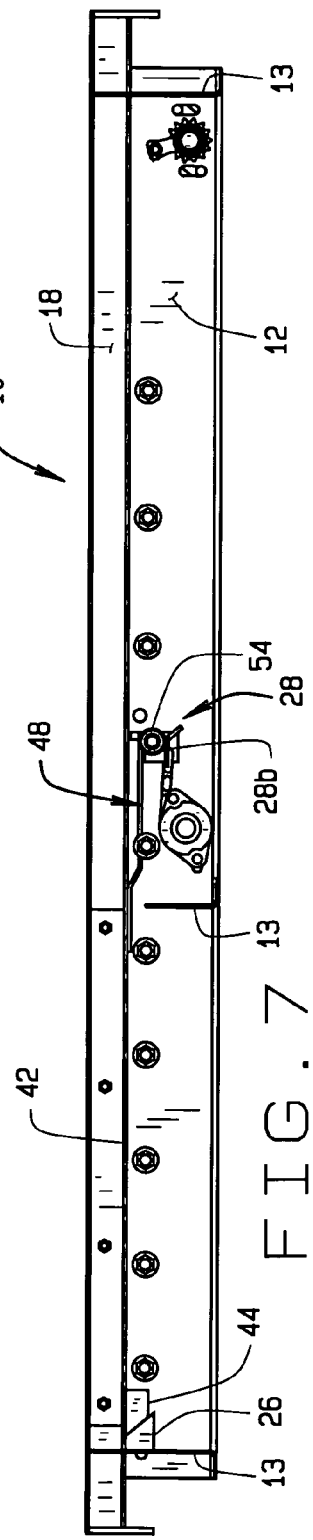
FIG. 7 is a cross-sectional view of the conveyor with the gate in a fully closed position.

A drive connector 48 extends rearwardly from the plate 42. The drive connector 48 includes a mounting portion which is fixed to the underside of the plate 42 forwardly of the extender bar 46, a sloped portion 48b which extends rearwardly and downwardly to a position below the extender bar 46, and a reach 48c which extends rearwardly beyond the back edge of the plate 42. The connector reach is generally parallel to, but spaced below, the plate 42. A finger 50 extends downwardly from the underside of the connector reach 48c at the rear thereof. A bracket 52 is mounted to the underside of the connector reach 48c proximate the finger 50. The bracket 52 has generally vertical side legs 52a to which rollers 54 are mounted. The rollers 54 are positioned by the bracket 52 such that they are aligned with the ramp surface 28a. The ramp 28 is positioned (and the connector reach 48c has a length) such that when the gate assembly is in its closed position (i.e., when the plate 42 closes the opening 22), the rollers 54 are positioned on the ramp surface 28b (as seen in FIG. 7).

The plate 42 is moved parallel to the rails 12 by means of a drive D. The drive illustrated in the figures is a manually operated chain and sprocket drive. It includes a chain 60 the opposite ends of which are secured to the drive connector finger 50 to form an endless loop. The chain 60 loops around a forward sprocket or gear 62 and a rear sprocket or gear 64. The sprockets 62 and 64 are mounted on axles 66 and 68, respectively. At least the sprocket 66 is fixed to the axle 68 to be rotated thereby. An extension shaft 70 extends from the back axle 68 beyond one of the rails 12. The extension shaft 70 is adapted to receive a wheel, crank or the like (not shown) which can be used by an operator to move the plate 42. As can be appreciated, as the extension 70 is rotated by the crank, wheel or the like, the axle 68, and hence the sprocket 66 will rotate. Rotation of the sprocket 66 will cause the chain 60 to move, thereby moving the plate 42. Rotation of the crank in one direction will move the plate from an open to a closed position, and rotation of the crank in the opposite direction will move the plate 42 from the open position to the closed position.

Although the drive is described to be manually operated, the shaft 70 can be connected to the output of a motor, in which case, the motor would drive the plate 42 between its open and closed position. Further, the chain and sprocket drive could be replaced with a rack and pinion drive. Alternatively, a liner actuator can be used to drive the plate. The linear actuator can be motor driven or in the form of a piston (either pneumatic or hydraulic). Any other type of desired drive can be used to move the plate between its open and closed positions.

A stop 80 is provided to maintain the gate assembly 40 in a desired position (whether that position be an open position, a closed position, or a partially open position). The lock 80 (shown best in FIGS. 2 and 4) comprises a shaft 82 located adjacent the drive extension shaft 70 and which is movable reciprocally movable in a direction generally parallel to the shaft 70. The shaft 82 is shown to be externally threaded and received in an internally threaded tube 84 which extends perpendicularly to (and through) the rail 12. A handle 86 is provided at an outer end of the shaft 82 and a lock member 88 is mounted to the opposite end of the shaft 82 between the rails 12. The axle 68 includes a sleeve 90 which is rotationally fixed to the axle 68. The sleeve 90 and lock member 88 are adapted to mate together. Thus, the sleeve 90 and lock member 88 can comprise teeth which engage each other, or any other structure whereby, when the sleeve and lock member are engaged, the lock member prevents the sleeve (and hence the axle 68) from rotating. As can be appreciated, rotation of the shaft in one direction will advance the shaft 82 and the lock member forwardly such that the lock member 88 will engage the sleeve, and rotation of the shaft 82 in the opposite direction will retract the lock member 88 from the sleeve 90, to disengage the lock member from the sleeve. When the lock member is engaged with the sleeve 90, the axle 68 cannot be rotated, and hence the position of the gate assembly 40 cannot be changed. Although the stop 80 comprises a threaded shaft 82, it will be appreciated that the shaft 82 could be reciprocated between its locking and unlocking positions by other means. For example, the shaft 82 could be reciprocated by means of a piston or solenoid. Other means for locking the gate assembly in a desired position could be used as well.

When the gate assembly 40 is closed, the plate 42 is positioned as shown in FIG. 7. In this position, the forward wedges 26 and 46 are wedged against each other and the rear rollers 54 are positioned on the ramp surface 28b. In this position, the plate 42 is held against the bottom of the side bumper flanges 24a, such that there is substantially no gap between the plate 42 and the flanges 24a. Hence, particulate matter (such as grain) cannot fit or pass between the plate 42 and the flanges 24a. Further, the plate 42 is substantially flush with the trough floor 16, such that the plate 42 and trough floor 16 present a substantially smooth surface.

When the gate is opened, the plate 42 is moved rearwardly relative to the conveyor 10. When the plate is initially moved rearwardly, the forward plate wedge 44 will slide down the forward opening wedge 26 and the rollers 54 will roll down the sloped surface 28a of the ramp 28. In this position, the plate 42 will be dropped below the level of the flanges 24a and the trough floor 16, as best shown in FIG. 3. The plate 42 can then be moved rearwardly relative to the opening 22 to open the opening.

Figure 6:
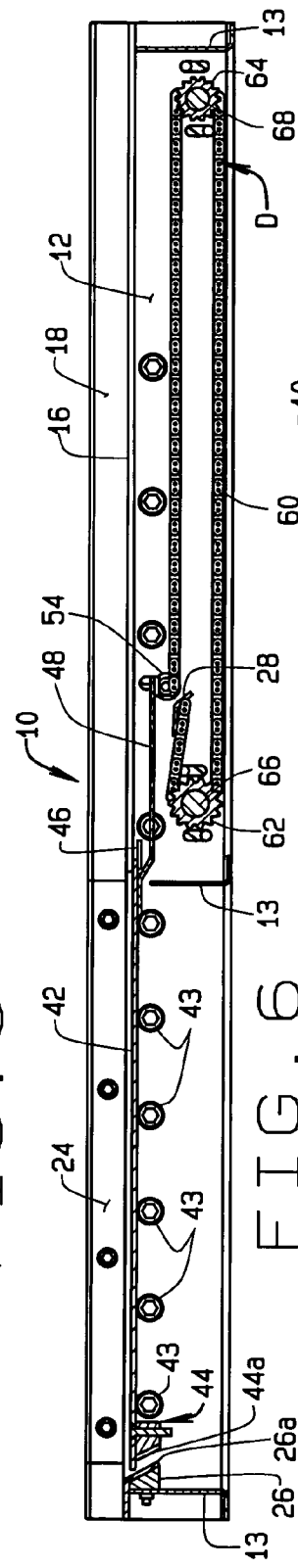
FIG. 6 is a cross-sectional view of the conveyor with the gate is an almost closed position.

To close the plate, the opposite actions are performed. The plate 42 is moved forwardly relative to the opening 22 until the forward wedges 26 and 46 are in contact with each other and the rollers 54 engage the ramp surface 28a, as seen in FIGS. 3 and 6. At this point, the plate 42 substantially closes the opening 22. However, the plate 42 needs to be moved forward a slight bit more. This additional forward movement of the plate 42 will cause the plate wedge 44 to ride up the opening wedge 26 and for the rear rollers 54 to ride up the sloped surface 28a of the ramp 28. The interaction between the wedges 44 and 26 and the rollers 54 and the ramp 28 raise the plate 42 off the rollers 43 an amount sufficient such that the upper surface of the plate 42 engages the underside of the side flanges 24a to close the gap between the plate 42 and the flanges 24a and to bring the plate 42 into a position in which it is generally flush with the floor 16 of the trough, as seen in FIG. 7. Thus, when the gate assembly is closed, the plate 42 in combination with the trough floor 16 present a substantially smooth surface.

As can be appreciated, the wedges 26 and 44 and the roller 54 and ramp 28 comprise lifting or raising means to bring the plate 42 into engagement with the flange 24a and to bring the plate 42 into position such that it is flush or substantially co-planar with the trough floor 16. Although wedges are used in the front and a roller/ramp combination is used at the rear of the gate assembly, wedges can be used at the front and rear of the gate assembly. Alternately, ramp/roller combinations can be used at both the front and rear of the gate assembly. The roller/ramp combination can be reversed, such that the rollers are mounted to the rails 12 and the ramps are mounted to the underside of the drive connector 48. Depending upon the position of the rear raising member or means, the drive connector can be substantially reduced in length, or even eliminated. Lastly, additional lifting members can be provided intermediate the ends of the plate 42 if necessary.

Different lifting means could be used. For example, the conveyor could be provided with cams which are rotated when the plate 42 is positioned beneath the opening to raise the plate 42 to seal against the bumper flange 24a and lower the plate from the sealed position to a lowered position in which the plate can be moved to its open position. Such cams could be rotated by a member on the rails or by a dedicated cam drive. Alternatively, such cams could be interconnected with the drive D to be rotated thereby to raise and lower the plate 42. Alternatively, pistons could be used to raise and lower plate between its raised/sealed position and its lowered/moving position.

As can be appreciated, the plate 42 of the gate assembly 40 moves in a direction parallel to the conveyor, rather than transverse to the conveyor. Hence, the conveyor 10 does not require any additional space to accommodate the gate assembly 40. Therefore, a conveyor including the gate assembly 40 can be installed in a space narrower than many currently available systems which include a gate assembly which moves transverse to the conveyor. Additionally, because the gate plate 42, in the closed position, is flush with the conveyor trough floor, and gaps between the plate 42 and the rails are minimized, it will be more difficult for the granular lading to become lodged between the gate plate 42 and the railing (or the bumper). Hence, the possibility of particulate lading interfering with the operation of the gate will be reduced. For example, the locking member 88 could engage the sprocket 64 directly. The shaft 88 could include a pin which engages a slot in, for example, the sprocket 64 or the sleeve 90.

As various changes could be made in the above constructions without departing from the scope of the invention, it is intended that all matter contained in the above description or shown in the accompanying drawings shall be interpreted as illustrative and not in a limiting sense.

The invention claimed is:

1. A conveyor for particulate lading comprising:
   a pair of spaced apart side rails;
   a trough positioned between said side rails and comprising a pair of side walls and a floor;
   an exit port in said floor through which the granular material can pass;
   a seal extending along side edges of said port; and
   a gate assembly movable between an open position in which said exit port is open and the particulate lading can pas therethrough and a closed position in which said port is closed and the particulate lading cannot pass; said gate assembly comprising:
     a plate movable parallel to the direction of said conveyor;
     a drive for moving said plate along to switch said gate assembly between its open and closed positions; and
     means for vertically moving said plate between a raised position in which said plate is generally flush with said trough floor and said plate engages said seal and a lowered position in which said plate is below a level of said trough floor such that said plate can be moved beneath said trough floor.

2. The conveyor system of claim 1 wherein said means for vertically moving said plate comprises a pair of forward elevating members and a pair of rear elevating members; said pairs of elevating members each comprising a movable part operatively mounted to said plate and a fixed part; said movable parts moving with said plate relative to said fixed parts.

3. The conveyor system of claim 2 wherein said fixed part of said pair of forward elevating members comprises a wedge positioned adjacent a forward edge of said exit port and said movable part comprises a wedge positioned proximate the forward edge of said plate.

4. The conveyor system of claim 2 wherein said fixed part of said pair rear elevating members comprises one of a roller and a ramp and the movable part of said pair of rear elevating members comprise the other of said roller and said ramp.

5. The conveyor system of claim 1 wherein said seal comprises a side flange extending substantially the length of said exit port.

6. The conveyor system of claim 1 including a plurality of rollers mounted to said railing along which said plate moves; said rollers being positioned such that when said plate is in its raised position said plate is elevated off said rollers and when said plate is in its lowered position said plate rests on said rollers to be moved by said drive.

7. A conveyor for particulate lading comprising:
a pair of spaced apart side rails;
a trough positioned between said side rails and comprising a pair of side walls and a floor;
an exit port in said floor through which the granular material can pass;
a seal extending along side edges of said port;
a forward fixed elevating member between said rails and positioned forwardly of said port;
a rear fixed elevating member mounted to said rails rearwardly of said port; and
a gate assembly movable between an open position in which said exit port is open and the particulate lading can pas therethrough and a closed position in which said port is closed and the particulate lading cannot pass; said gate assembly comprising:
a plate movable parallel to the direction of said conveyor;
a drive for moving said plate along to switch said gate assembly between its open and closed positions;
a forward moving elevating member operatively mounted to an underside of said plate and aligned with said forward fixed elevating member; and
a rear moving elevating member operatively mounted to an underside of said plate and aligned with said rear fixed elevating member;
wherein, said movable elevating members are moved relative to said fixed elevating members as said gate is moved between its open and closed positions; said fixed and movable elevating members cooperating with each other to raise said plate into engagement with said seal when said gate is in its closed position and to lower said plate to a position beneath said trough when said gate is moved to an open position to allow said plate to slide beneath said trough floor.

8. The conveyor of claim 7 wherein said fixed and moving elevating members comprise opposed wedges and/or roller/ramp combinations.

9. The conveyor of claim 7 including an extension member extending rearwardly of said plate; said rear moving elevating member being mounted to said extension member.

10. The conveyor of claim 7 including a flat bar extending from a back edge of said plate; said bar having a length at least equal to the width between said seals to close any gap which might exist between the back edge of the plate and the forward edge of the trough.

11. The conveyor of claim 7 including a stop comprising a drive engaging member to maintain said gate assembly in a desired position.

12. The conveyor of claim 11 wherein said drive comprises an axle; said drive engaging member comprises a reciprocally movable shaft having a lock member at one end thereof; said shaft being movable between a first position in which said lock member is operatively engaged with said axle to substantially prevent rotation of said axle and a second position in which said lock member is disengaged from said axle to permit rotation of said axle.

13. A method of closing an in-line gate of a conveyor system; the conveyor system comprising:
a pair of spaced apart side rails; a trough positioned between said side rails and including side walls and a floor; an exit port in said floor through which lading pass; a flange extending along the length of said exit port and extending into said exit port; and a gate movable in a direction parallel to the rails between an open position in which said exit port is open and the lading can pas therethrough and a closed position in which said exit port is closed and the lading cannot exit said conveyor;
the method comprising:
moving said gate forwardly to substantially close said exit port; and
raising said gate such that said gate is substantially flush with said trough floor and such that a top surface of said gate engages a bottom of said flange.

14. A method of opening an in-line gate of a conveyor system; the conveyor system comprising:
a pair of spaced apart side rails; a trough positioned between said side rails and including side walls and a floor; an exit port in said floor through which lading pass; a flange extending along the length of said exit port and extending into said exit port; and a gate movable in a direction parallel to the rails between an open position in which said exit port is open and the lading can pas therethrough and a closed position in which said exit port is closed and the lading cannot exit said conveyor;
the method comprising:
lowering said gate such that said gate is spaced below said flange and below the floor of said trough; and
moving said gate rearwardly to slide said gate under said trough floor to open said exit port.

* * * * *